United States Patent [19]

McLeary et al.

[11] Patent Number: 4,488,310
[45] Date of Patent: Dec. 11, 1984

[54] CONTINUOUSLY EXCITED LASER

[75] Inventors: Ross C. McLeary, Elsternwick; Peter J. Beckwith, Strathmore, both of Australia

[73] Assignee: The Commonwealth of Australia, Canberra, Australia

[21] Appl. No.: 387,880

[22] PCT Filed: Dec. 2, 1981

[86] PCT No.: PCT/AU81/00177

§ 371 Date: Jun. 4, 1982

§ 102(e) Date: Jun. 4, 1982

[87] PCT Pub. No.: WO82/01964

PCT Pub. Date: Jun. 10, 1982

[30] Foreign Application Priority Data

Dec. 3, 1980 [AU] Australia ............... PE6731

[51] Int. Cl.³ ............................................. H01S 3/22
[52] U.S. Cl. ................................... 372/58; 372/59; 372/90; 372/61
[58] Field of Search ............ 372/90, 59, 55, 58, 372/61

[56] References Cited

U.S. PATENT DOCUMENTS

| 3,302,127 | 1/1967 | Shao-Chi Lin | 372/58 |
| 3,496,489 | 2/1970 | Shao-Chi Lin | 372/58 |
| 3,571,747 | 3/1971 | Bronfin et al. | 372/58 |

*Primary Examiner*—William L. Sikes
*Assistant Examiner*—Léon Scott, Jr.
*Attorney, Agent, or Firm*—Dennis P. Clarke

[57] ABSTRACT

There is disclosed continuously-excited lasers of the $CO_2$ mixing, and supersonic CO, types. There is specifically disclosed a method, and a laser apparatus, for producing a repetitively pulsed output, in which a stream of excited gas, of the type having a relatively long excitation life, is produced, stored and subsequently transferred, in the form of pulses, to a power extraction zone incorporating a resonator. In one example the gas laser is a supersonic CO laser in which the CO is excited in the excitation zone and is, after storage, transferred under supersonic conditions to the resonator. In the main example the gas to be excited is $N_2$ which is initially transferred to a storage chamber provided between a rotatable storage cylinder (16) and an axial supporting shaft (18) therefor, and thereafter the $N_2$ is transferred through holes (17) in the storage cylinder (16) which align during rotation with slots (20) through a surrounding fixed cylinder (19) to allow pulses of excited gas to be transferred to the power extraction zone (12) where it is mixed with $CO_2$ and He, entering through supply tubes (23), and to which it transfers its excitation before flowing to the resonator.

10 Claims, 6 Drawing Figures

4,488,310

CONTINUOUSLY EXCITED LASER

TECHNICAL FIELD

This invention relates to a continuously-excited laser, and more particularly a technique by which repetitively-pulsed outputs may be obtained from such a laser.

The invention particularly relates to producing repetitively-pulsed outputs from continuously excited gas lasers of the type in which the processes of excitation and power extraction are separate.

BACKGROUND ART

There are two main forms of lasers of this type, namely $CO_2$ mixing lasers and supersonic CO lasers.

Common examples of $CO_2$ mixing lasers are described in an article entitled "High-Power $CO_2$ Electric Discharge Mixing Laser" by Clyde O. Brown and published in Appl. Phys. Lett. Vol. 17 dated November 1970 at pages 388–391, and also in a report entitled "A 30-kW $CO_2$ Mixing Laser" by Ross C. McLeary, Russell E. Whitcher and Peter J. Beckwith and published in a Materials Research Laboratories' report MRL-R-751 dated July 1979.

It is known with such $CO_2$ mixing lasers to, in the excitation stage, continuously excite a gas having a relatively long excitation life, and to subsequently continuously feed the excited gas into a mixing zone in the power extraction stage where it is mixed with $CO_2$, or $CO_2$ and He, and transfers its excitation to the $CO_2$ which has a relatively shorter excitation life. The gas mixture subsequently passes to the resonator to produce a laser beam.

A known form of supersonic CO laser is disclosed in an article entitled "Performance of a Large, CW, Pre-excited CO Supersonic Laser" by John W. Daiber and Herbert M. Thompson and published in IEEE J. Quantum Electron, Vol. QE-13, dated January 1977 at pages 10 to 17. It is known with such supersonic CO lasers to continuously excite CO in the excitation stage. CO, which has a relatively long excitation life, is continuously fed under supersonic conditions to the resonator of a cooled power extraction stage to produce a laser beam.

DISCLOSURE OF THE INVENTION

We have found that if, instead of continuously transferring the excited gas from the excitation stage to the power extraction stage, the excited gas is supplied in the form of a series of pulses, the system is simpler than conventional methods of producing repetitively pulsed outputs.

The basis of the present invention rests with supplying the power extraction stage with a series of pulses of excited gas corresponding to the required train of output pulses. The excitation of the gas in effect takes place between the transfer of pulses and the technique is most efficient in situations where the gas being excited has a relatively long excitation life compared with the inter-pulse (storage) time and when the injection time for the pulses of gases into the power extraction stage is short compared with the interpulse time. If the above conditions are satisfied the ratio of pulse-power output to the equivalent CW output would approximate the ratio of interpulse (storage) time to the injection time.

The invention may therefore envisage a method of obtaining a repetitively-pulsed output from a continuously excited gas laser, said method comprising continuously producing, in an excitation zone, a stream of excited gas of a type having a relatively long excitation life, storing such excited gas and subsequently transferring said gas, in the form of pulses, to a power extraction zone incorporating a resonator.

In the case where the gas laser is a $CO_2$ mixing laser the gas which is excited in the excitation zone is, after storage, transferred in pulses to a mixing region in the power extraction zone and in which it is mixed with $CO_2$ to transfer its excitation thereto prior to the mixture flowing into the resonator. Preferably the gas is $N_2$.

In the case where the gas laser is a supersonic CO laser, the CO gas itself is excited in the excitation zone and is, after storage, transferred under supersonic conditions to the resonator in the power extraction zone.

The invention also envisages a continuously excited gas laser for producing a repetitively-pulsed output in accordance with the above method.

BRIEF DESCRIPTION OF THE DRAWINGS

One preferred form of the invention will now be described with reference to the accompanying drawings, in which.

In this preferred embodiment a $CO_2$ mixing laser based on the plasma-injection method has been used to illustrate the features of the present invention. Plasma-injection lasers are disclosed in an article entitled "Plasma-Jet $CO_2$ Laser" by E. K. Zaroslov, E. K. Karlova, N. V. Karlov, G. P. Kuz'min and A. M. Prokhorov, and published in JETP Lett. Vol. 15 dated June 1972 at pages 470 to 472 and an article entitled "Uniform Continuous Discharges and $CO_2$ Laser Action at Atmospheric Pressure by Plasma Injection" by R. McLeary, P. J. Beckwith and W. E. K. Gibbs, and published in IEEE J. Quantum Electron, Vol. QE-10 dated September 1974 at Pages 649 to 651.

This laser uses commercial high-purity $N_2$ which, when excited in an electrical discharge, has from previous work been found to have a lifetime of about 7 ms at a pressure of 100 kPa. The vibrationally-excited $N_2$ may thus be stored for several milliseconds at this pressure and for longer periods at reduced pressure. The laser delivers 14-kW pulses of width 1 ms (FWHM) at a repetition frequency of 200 Hz. Similar output powers are also obtained at lower repetition frequencies with correspondingly longer pulses.

BEST MODE FOR CARRYING OUT THE INVENTION

Figure 1:
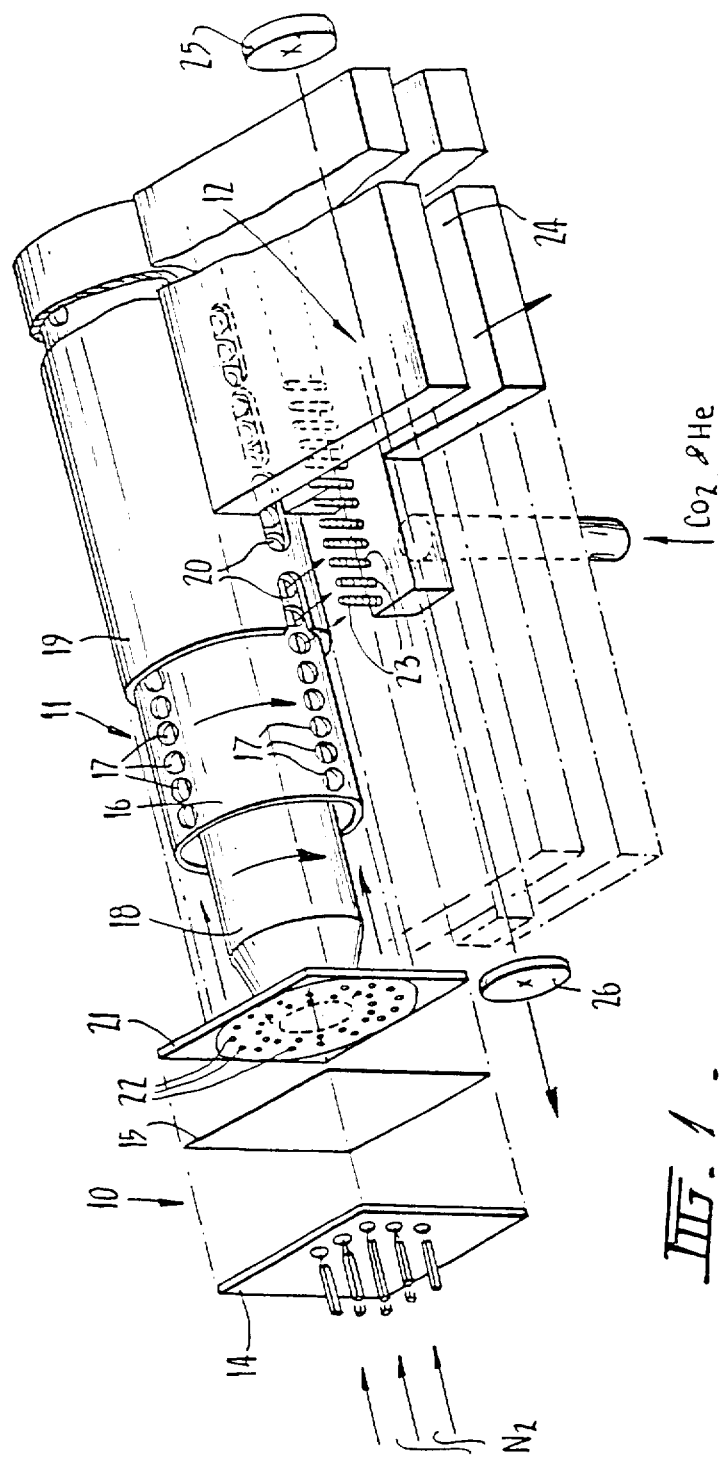
FIG. 1 is a schematic diagram, partly sectioned, of a continuously excited gas laser for producing a repetitively-pulsed output in accordance with the present invention.
Figure 2:
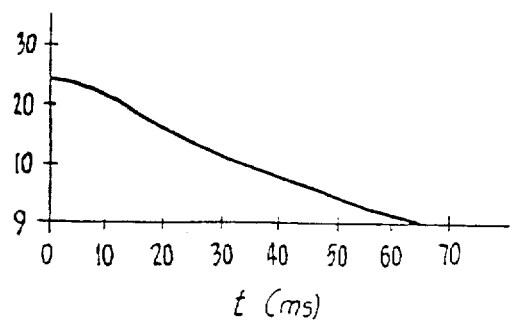
FIG. 2 is a plot of total pin current against time with the gas laser of FIG. 1.
Figure 3:
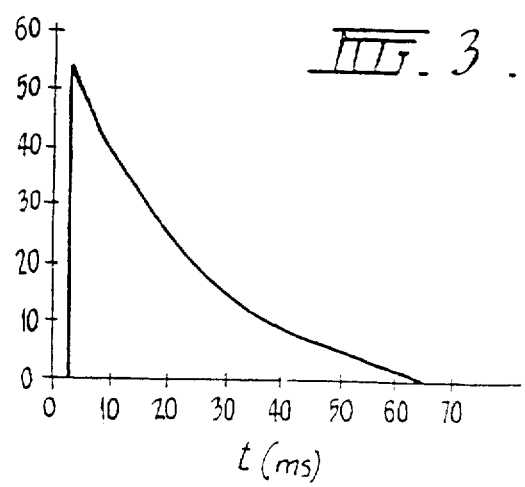
FIG. 3 is a plot of main-discharge power against time for the same system.

The apparatus of this preferred form of the invention is shown in FIG. 1, and consists of three sections comprising discharge, storage and mixing/resonator zones 10, 11 and 12 respectively. The discharge zone consists of a 10×10 array of pre-ionising pin electrodes 13 with a 10-mm spacing and a 60-mm long main discharge formed between a perforated-plate electrode 14 and mesh electrode 15. The mass-flow rate of $N_2$ through the discharge is 140 g/s at a pressure of 100 kPa. Electrical power is supplied to the pin electrodes 13 and main discharge 14, 15 from capacitor banks (not shown). Typical total pin current and main discharge power are shown in FIGS. 2 and 3 where it can be seen that the discharge operates in a quasi-continuous fashion for a period of 60 ms.

The storage zone 11 consists of a rotatable storage cylinder 16, 83 mm in diameter and 1 m long, having four rows of holes 17, each 11 mm in diameter, along its length. Each row contains sixty-three holes 17, of which only some are shown in FIG. 1 for simplicity of illustration. The rows are spaced at 90° around the cylinder. A central rotatable supporting shaft 18 is also provided and is 65 mm in diameter thus providing a storage volume of 2 liters between the shaft 18 and the cylinder 16. The storage cylinder 16, which is fed from one end with excited $N_2$, rotates within a fixed outer cylinder 19 which has a series of slots 20 of height 11 mm and total length 860 mm. Once again, for simplicity of illustration, only some of the slots 20 have been shown in FIG. 1. Four times during each revolution of the storage cylinder 16 a row of holes 17 is aligned with the slots 20 and a burst of excited $N_2$ flows from the storage zone 11 into the resonator/mixing zone 12. The maximum and minimum values of the gas pressure in the storage zone depend on the efficiency of the gas transfer through these ports and on the $N_2$ flow rate. The discharge zone 10 is isolated from pressure fluctuations by means of a set of sonic orifices 22 in an orifice plate 21 between the two zones. The mass flow is restricted to a value such that the maximum pressure in the storage zone is about 50 kPa, which is half the pressure in the discharge zone.

The mixing system comprises a row of one hundred tubes 23 each 20 mm high and 4 mm in diameter, spaced at 10 mm intervals. Once again, for simplicity of illustration, only some of the tubes 23 have been shown in FIG. 1. $CO_2$ and He are injected through slits in the tubes 23 into the $N_2$ stream and the gas mixture then flows into the resonator, which has its optical axis 28 mm downstream from the mixing tubes 23. The gas mixture, which has a composition $CO_2:N_2:He$ of approximately 1:8:2 during the pulse, is exhausted into a vacuum tank through an exhaust passage. For convenience, the $CO_2$ and He flow is quasi-continuous and not pulsed. The resonator consists of a fully-reflecting curved mirror 25 (radius of curvature 2 m) and a dielectric-coated KCl flat 26 with 50% reflectivity.

Figure 4:
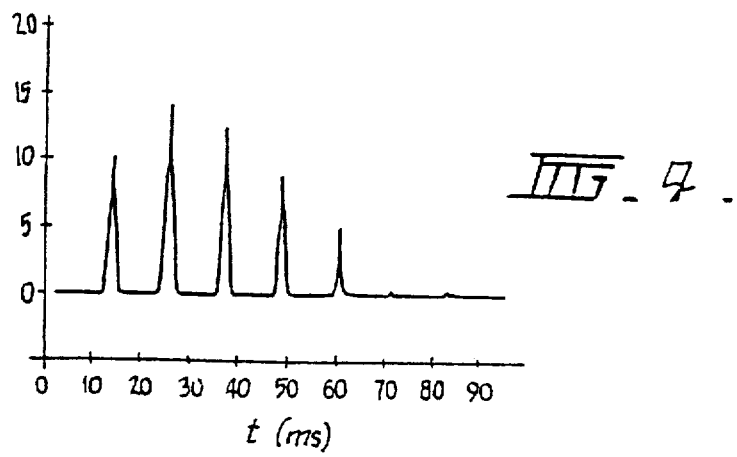
FIG. 4 is a plot of the output power waveform under a first set of repetition frequency and resonator pressure conditions.
Figure 5:
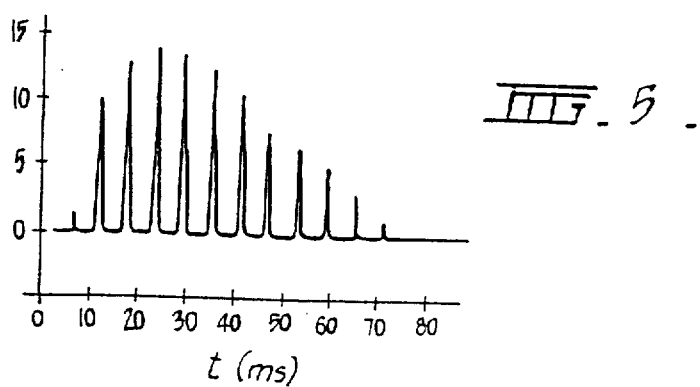
FIG. 5 is a plot of the output power waveform under a second set of repetition frequency and resonator pressure conditions.
Figure 6:
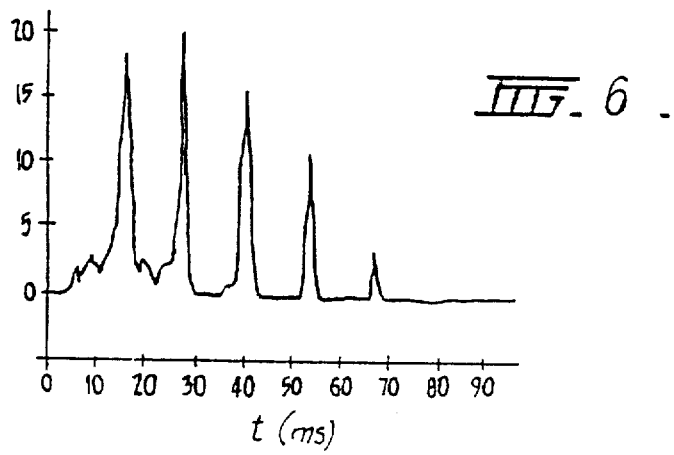
FIG. 6 is a plot of the output power waveform under a third set of repetition frequency and resonator pressure conditions.

Typical output-power waveforms are shown in FIGS. 4 and 5 for repetition frequencies of 86 Hz and 167 Hz respectively and a resonator pressure of 14 kPa. It is to be noted that the peak powers (or equivalently the total energies) obtained are insensitive to the repetition frequency up to at least 200 Hz, which is the limit for this apparatus. The extracted energy corresponds to about 9% of the electrical energy deposited in the $N_2$ discharge. FIG. 6 shows a typical output power waveform obtained at a lower resonator pressure of 6 kPa. It can be seen that there is a substantial amount of laser action corresponding to a flow of excited $N_2$ in the nominally closed position of the rotatable storage cylinder 16. This flow is due to the leakage that occurs by way of the small gap between the rotatable storage cylinder 16 and the fixed outer cylinder 19. Prevention of this leakage would give a pulse train with no inter-pulse laser action, and at this pressure (6 kPa) the efficiency would be about 13%. At the higher resonator pressure of FIGS. 4 and 5 no lasing occurs between pulses because the combination of high pressure and high $CO_2$ concentration (between pulses) gives rise to a short upper-laser-level lifetime and a consequent reduction of gain below resonator threshold. With the present geometry the ratio of the peak power to the CW power obtained with the storage cylinder 16 stationary and in the open position, that is, with one row of holes 17 and the slots 20 aligned, is about 3:1. A significant improvement on this ratio is obtainable by increasing the mass-flow rate through the ports provided by the hole and slot combinations and correspondingly decreasing the proportion of the time that the ports are open.

As an additional means of increasing the peak power the resonator may be Q-switched (for example with a vibrating mirror) and thus reduce the pulse width to a few tens of microseconds. This is possible since the upper-laser-level lifetime is comparable to the laser pulse durations obtainable for the conditions of FIG. 5. For good efficiency in this case a resonator of larger volume than that described above would be required.

We claim:

1. A method of obtaining a repetitively-pulsed output from a continuously excited gas laser, said method comprising continuously producing by electric discharge, in an excitation zone, a stream of excited gas of a type producing a population inversion and having a long excitation life, storing said excited gas in a storage zone and subsequently transferring said gas, in the form of pulses of gas under pressure, to a power extraction zone containing a resonator to provide a coherent output.

2. A method as claimed in claim 1, wherein the gas laser is a $CO_2$ mixing laser and the gas which is excited in the excitation zone is, after storage, transferred in pulses of gas under pressure to a mixing region in the power extraction zone and in which it is mixed with a gas including $CO_2$ to transfer its excitation thereto prior to the mixture thereof flowing into the resonator.

3. A method as claimed in claim 2, wherein the gas which is excited in the excitation zone is $N_2$.

4. A method as claimed in claim 1, wherein the gas laser is a supersonic $CO_2$ laser, and the $CO_2$ gas itself is excited in the excitation zone and is, after storage, transferred under supersonic conditions to the resonator in the power extraction zone.

5. A continuously excited gas laser, comprising an excitation zone in which a stream of excited gas of a type producing a population inversion and having a long excitation life is continuously excited by electric discharge, means for storing such excited gas and subsequently transferring said gas, in the form of pulses of gas under pressure, to a power extraction zone containing a resonator to produce a coherent output.

6. A continuously excited gas laser as claimed in claim 5, wherein the gas laser is a $CO_2$ mixing laser and wherein the power extraction zone incorporates a mixing region into which the pulses of excited gas under pressure are transferred and in which it is mixed with a gas including $CO_2$ to transfer its excitation thereto prior to the mixture flowing into the resonator.

7. A continuously excited gas laser as claimed in claim 5 or 6, wherein the means for storing and subsequently transferring said excited gas includes an elongate storage cylinder and a rotatable supporting shaft extending axially of, and within, said cylinder and fixed thereto, the space between said storage cylinder and said supporting shaft providing a storage chamber within which said excited gas is stored.

8. A continuously excited gas laser as claimed in claim 7, wherein the cylindrical wall of said storage cylinder has a plurality of rows of holes extending longitudinally thereof, and wherein said storage cylinder rotates within a fixed outer cylinder having a row of slots extending axially thereof, each slot aligning with a number of said holes in each row of said storage cylinder during rotation of said storage cylinder such as to allow pulses of excited gas under pressure to be transferred from said storage chamber to the power extraction zone each time said slots align with said holes as said storage cylinder rotates.

9. A continuously excited gas laser as claimed in claim 6, wherein said mixing region is supplied with a gas including $CO_2$ through a plurality of supply tubes having slits therein and positioned within the stream of excited gas entering said mixing region.

10. A continuously excited gas laser as claimed in claim 5 or 6, wherein the excitation zone incorporates an array of pre-ionising pin electrodes coupled to a power supply, and a discharge region, spaced from and aligned with said array, and formed between a perforated plate electrode and a mesh electrode spaced apart therefrom.

* * * * *